3,480,677
NOVEL IONONE
Walter C. Meuly, Piscataway Township, New Brunswick County, and Peter S. Gradeff, Somerset, N.J., assignors to Rhodia Inc., New Brunswick, N.J., a corporation of New York
No Drawing. Continuation-in-part of application Ser. No. 300,907, Aug. 8, 1963. This application Aug. 29, 1966, Ser. No. 575,558
Int. Cl. C07c 49/26, 45/00
U.S. Cl. 260—587    1 Claim

ABSTRACT OF THE DISCLOSURE

4[(9 - 10)-dehydro-2,2-dimethyldecahydronaphthy-1]3-butene-2-one, with utility as an odorant in perfume compositions, has been prepared.

---

This application is a continuation-in-part of Ser. No. 300,907, filed Aug. 8, 1963, now U.S. Patent No. 3,296,080.

This invention relates to novel unsaturated ketones, and more specifically, to novel substituted ionones.

Ionones represent one of the most important classes of perfume chemicals, and are of great economical value in the creation of violet and many other perfume notes. When an aldehyde, compound I below, for instance citral in which $R_1$ is methyl and both $R_2$ and $R_3$ are hydrogen, is condensed with acetone, under alkaline conditions, it forms pseudoinone, compound II, which is then cyclized to the ionone III under the action of a strong acidic reagent, for instance sulfuric acid, phosphoric acid, as well as Lewis acids, such as boron trifluoride and zinc chloride. These reactions may be represented as follows:

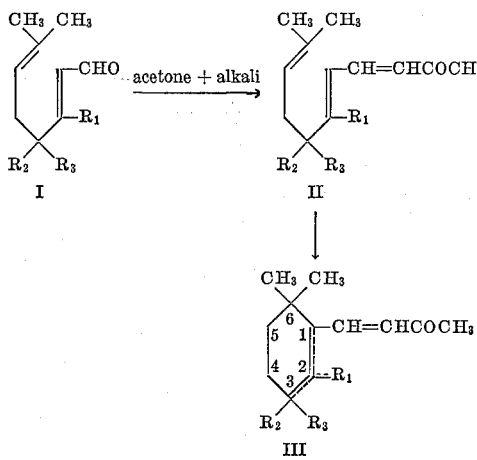

The dotted lines in Formula III above indicate that the double bond may be on the carbon atom in the 1-position, or in the 2-position, or in the exo/position, between $R_1$ and the carbon atom in the 2-position of the ring, thus converting, for instance, the —$CH_3$ group of ionone to a =$CH_2$ group. Ionones with the double bond in the 2-position are called alpha ionones; when the double bond is in the 1-position, they are called beta ionones, and when the double bond is in the exo position, they are called gamma ionones.

A few substituted ionones have been prepared. If instead of acetone, citral is condensed with methyl ethyl ketone, the product which contains one more carbon atom in the side chain, is called methyl ionone. Other products with different substitution in the side-chain have been prepared by condensation with allyl acetone or mesityl oxide or diethyl ketone, instead of acetone.

The naturally occurring irones contain one additional methyl group in the 5-position of the ring. This modification makes irone itself of outstanding value in perfumery. Irones may be synthesized from methyl citral, by condensation with ketones, as discussed above.

The foregoing summary demonstrates that most of the synthetic work in the field of ionones has been directed to either introducing a substituent in the 5-position, or to increasing the molecular weight of the side-chain while retaining the —$CH_3$ group in the 2-posiiton as in ionone itself. To our knowledge, the introduction of substituents higher than the methyl group in the 2-position, and of one or two substituents in the 3-position of the ionone ring, has hardly been explored.

It has now been found, surprisingly, that substituents higher than the methyl group in the 2-position of the ionone ring, give a variety of products with valuable odor properties. Further, it has been found that new ionones of unexpected and outstanding odor properties may be obtained if, in addition to a substituent in the 2-position of the ionone ring, one or two substituents are also introduced into the 3-position.

An object of this invention is to provide novel ionones which are substituted both in the 2-and in the 3-position of the ionone ring.

Another object is to provide novel ionones which are substituted with groups higher than the methyl group in the 2-positions.

Still another object is to provide ionones in which the substituents in the 2- and 3-position are condensed to form a cyclic structure.

A further object is to provide novel ionones which are particularly valuable in perfume compositions, with novel nuances, great intensity and lasting power.

Another object is to provide an economical process for the preparation of the novel compounds of this invention.

The novel ionones of this invention have the general Formula IV below:

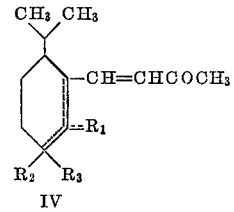

The dotted line in Formula IV indicates that the double bond is located in the 1-position or in the 2-position of the ring, or that it may be in the exo position, between the carbon atom in the 2-position and the side-chain, so that the products may be beta ionones or alpha ionones or gamma ionones.

In Formula IV above, $R_1$ is a lower alkyl group containing between 1 and 4 carbon atoms, $R_2$ is H or a lower alkyl group containing between 1 and 3 carbon atoms, and $R_3$ is H or $CH_3$. When $R_1$ is methyl, $R_2$ is an alkyl group greater than ethyl and $R_3$ is hydrogen. When, however, both $R_1$ and $R_2$ are methyl, then also $R_3$ is methyl. Then novel ionones of the invention are further characterized by the fact that $R_1$ and $R_2$ together may form a trimethylene or tetramethylene bridging group. The novel ionones described herein are listed in Table III below.

The novel compounds of this invention predominantly exist in the alpha ionone structure. The gamma isomer structure, present in variable amount, is detected by nuclear magnetic resonance and infrared analysis. When two substituents are present in the 3-position, the alpha structure may not exist, and the beta ionone structure is present.

According to one process for the preparation of the novel ionones of this invention, an unsaturated carbinol, prepared as described in our copending application Ser. No. 300,907, is oxidized to the aldehyde, condensed with acetone under alklaine conditions, to give a pseudoionone, which is then cyclized to the ionone under the action of a strong acidic reagent, specifically, phosphoric acid or sulfuric acid. The unsaturated carbinols described in the above-mentioned copending application, are tertiary carbinols of the type of linalool, and exhibit valuable properties as perfuming agents. The novel aldehydes, oxidation products of the carbinols, have also valuable perfuming properties, in addition to being intermediates for the synthesis of the novel ionones of this invention.

tion into the individual components is not required. In this respect, the ionones of this invention are similar to the known ionones, which are usually mixtures of several isomers.

For the oxidation of the carbinols to the aldehydes, the procedure with alkali bichromate, acetic acid or sulfuric acid, as described for instance in U.S. Patent 2,589,275, and U.S. Patent 2,815,386 and by Kuhn, Berichte 70 1897 (1937), may be used. It has now been found that superior yields are obtained, if the solution of sodium bichromate in 25% sulfuric acid is added to a boiling solution of the unsaturated carbinols in acetone, as a solvent. This process is advantageous because it obviates the need of acetic acid, which is more expensive than sulfuric acid, and gives yields at least 10% higher. Another advantage of the process resides in the fact that when the aldehydes are intermediates towards the synthesis of the pseudoionones and ionones, the acetone, used as a solvent, condenses with the aldehyde, after addition of alkali, to give the corresponding pseudoionone. In this manner, evaporation of the solvent and isolation of the intermediate aldehyde are not necessary, and substantial time and labor saving are achieved.

Table II below lists the novel pseudoionones of this invention.

TABLE II

| Novel Pseudoionone Homologue | $R_1$ | $R_2$ | $R_3$ |
|---|---|---|---|
| 5-[2-(3-methyl-2-buten-1-yl)-1-cyclo-hexyliden]-3-penten-2-one | —$CH_2CH_2CH_2CH_2$— | | H |
| 7,10-dimethyl-6-butyl-3,5,9-undecatrien-2-one | $C_4H_9$ | $CH_3$ | H |
| 6-ethyl-7-propyl-10-methyl-3,5,9-undecatrien-2-one | $C_2H_5$ | $C_3H_7$ | H |
| 6,10-dimethyl-7-isopropyl-3,5,9-undecatrien-2-one | $CH_3$ | $(CH_3)_2CH$— | H |
| 10-methyl-6-isobutyl-3,5,9-undecatrien-2-one | i-butyl | H | H |
| 6,7,7,10-tetramethyl-3,5,9-undecatrien-2-one | $CH_3$ | $CH_3$ | $CH_3$ |
| 10-methyl-6-isopropyl-3,5,9-undecatrien-2-one | $(CH_3)_2CH$— | H | H |

Table I below lists the novel aldehydes, of this invention, which are homologs of citral.

Listed below in Table III are the novel ionones of this invention.

TABLE I

| Novel Citral Homologs | $R_1$ | $R_2$ | $R_3$ |
|---|---|---|---|
| 2-(3-methyl-2-buten-1-yl)-cyclohexyliden-acetaldehyde | —$CH_2CH_2CH_2CH_2$— | | H |
| 4,7-dimethyl-3-butyl-2,6-octadien-1-al | $C_4H_9$ | $CH_3$ | H |
| 7-methyl-3-ethyl-4-propyl-2,6-octadien-1-al | $C_2H_5$ | $C_3H_7$ | H |
| 3,7-dimethyl-4-isopropyl-2,6-octadien-1-al | $CH_3$ | $(CH_3)_2CH$— | H |
| 3-isobutyl-7-methyl-2,6-octadien-1-al | i-butyl | H | H |
| 3,4,4,7-tetramethyl-2,6-octadien-1-al | $CH_3$ | $CH_3$ | $CH_3$ |
| 7-methyl-3-isopropyl-2,6-octadien-1-al | $(CH_3)_2CH$— | H | H |

TABLE III

| Novel Ionone Homologue | $R_1$ | $R_2$ | $R_3$ |
|---|---|---|---|
| 4-[(9-10)dehydro-2,2-dimethyl-decalin-1-yl]-3-buten-2-one | —$CH_2CH_2CH_2CH_2$— | | H |
| 4-(2-butyl-3,6,6,-trimethyl-cyclohexen-2-yl)-3-buten-2-one | $C_4H_9$ | $CH_3$ | H |
| 4-(2-ethyl-3-propyl-6 6-dimethyl-cyclohexen-2-yl)-3-buten-2-one | $C_2H_5$ | $C_3H_7$ | H |
| 4-(2,6,6-trimethyl-3-isopropyl-cyclohexen-2-yl)-3-buten-2-one | $CH_3$ | $(CH_3)_2CH$— | H |
| 4-(2-isobutyl-6,6-dimethyl-cyclohexen-2-yl)-3-buten-2-one | i-butyl | H | H |
| 4-(2,3,3,6,6-pentamethyl cyclohexen-1-yl)-3-buten-2-one | $CH_3$ | $CH_3$ | $CH_3$ |
| 4-(2-isopropyl-6,6-dimethyl-cyclohexen-1-yl)-3-buten-2-one | $(CH_3)_2CH$— | H | H |

As it is described in detail in the same above-mentioned copending application, the carbinols, starting materials for the preparation of the aldehydes within the scope of this invention, in some instances, are not single compounds, but mixtures of two carbinols, because they are prepared from a mixture of two ketones, obtained by the process described in our copending application Ser. No. 502,585, now abandoned, which is a continuation-in-part of Ser. No. 241,036 filed Nov. 29, 1962, now abandoned. The process therein described, gives mixture of ketones, if the starting material is unsymmetrical and if it additionally contains at least one active hydrogen on each of the two alpha-positions adjacent to the carbonyl group. As already mentioned in Ser. No. 300,907, now U.S. Patent No. 3,296,080, it has been found that the mixture of the two carbinols has a richer odor than each of the individual components and that no separation is required. Similarly in the case of the ionones described herein, the final products, the ionones, if prepared from a mixture of two carbinols, are also obtained as mixtures. The mixtures, however, have excellent odor properties, and separa-

EXAMPLE 1

Preparation of 4[(9–10)dehydro-2,2-decahydronaphthyl-1]-3-buten-2-one (a) Preparation of 2-(3-methyl-2-buten-1-yl) cyclohexyliden-acetaldehyde.—To 194 g. (1 mole) of 1-vinyl-2-(3-methyl-2-buten-1-yl) 1-cyclohexanol, prepared from 2-(3-methyl-2-butenyl)-cyclohexanone by reaction with vinyl magnesium bromide, as described in copending application Ser. No. 300,907, in 250 grams of acetone, there is added, under reflux over a period of five hours, 178 g. of $Na_2Cr_2O_7 \cdot 2H_2O$ in 700 g. of 25% sulfuric acid. After refluxing an additional 35 minutes and cooling, the aqueous layer is discarded, and the organic layer is washed with 5% NaOH, water, dried and evaporated to remove the acetone. The crude product, 182 grams, contains 55.2% of the 2,(3-methyl-2-buten-1-yl)-cyclo-hexyliden-acetaldehyde. B.P. 121°–125° C./0.8 mm.; $n_D^{20}$ 1.5142–1.5146.

The substance possesses a rich, earthy and fruity note, which makes it useful for oriental type perfumes. The lasting power is greatly superior to citral, since it still exhibits a powerful odor after 5 days on a blotter, while citral under the same conditions, fades within 24 hours.

(b) Preparation of 5-[2-(3-methyl-2-buten-1-yl)-1-cyclohexyliden]-3-penten-2-one.—To a refluxing solution of 194 grams of 1-vinyl-2-(3-methyl-2-buten-1-yl)-cyclohexanol and 250 grams of acetone, there is added, under stirring, a mixture of 178 g. $Na_2Cr_2O_7 \cdot 2H_2O$ in 706 grams 25% sulfuric acid, over a period of 5 hours. After refluxing one additional hour, the lower layer is discarded. To the organic layer, 400 grams of acetone and a solution of 30 grams 98% NaOH in 350 cc. of water are added and the mixture stirred 20 hours at room temperature. The pseudoionone is obtained by neutralization with acetic acid, evaporation of acetone, extraction with cyclohexane and fractionation. The crude product (186 g.), on distillation, yeilds 5-[2-(3-methyl-2-buten-1-yl)-1-cyclohexyliden]-3-penten-2-one (93% pure), B.P. 140°–145° C./1 mm.; $N_D^{20}=1.5465-1.5475$.

(c) Preparation of 4-[(9–10)-dehydro-2,2-decahydronaphthyl-1]-3-buten-2-one.—The general procedure for the cyclization with phosphoric acid consists of slowly adding under stirring, the pseudoionone to 5 parts of 85% phosphoric acid at 10° C.; the reaction mixture is then poured into ice, the product extracted with benzene and the extract washed, dried and distilled.

Application of this procedure, to 61 grams of the pseudoionone obtained in (b) above, gives 25 grams of the ionone, B.P. 129°–131° C./0.3 mm.; $N_D^{20}=1.5197-1.5204$.

*Analysis.*—Calcd for $C_{16}H_{24}O$: C, 82.70%; H, 10.41%. Found: C, 83.20%; H, 10.57%.

Ultraviolet analysis indicates the absence of carbon to carbon conjugated double bond, that is the absence of a beta-ionone structure. Nuclear magnetic resonance spectrum indicates that the substance is the alpha ionone isomer, with minor amount of the gamma isomer.

The substance has a very interesting odor, which is only partly that of other ionones. It has a soft, warm, woody, earthy character, resembling ambergris. Like ambergris, it is extremely tenacious and constitutes an excellent fixative for perfumes. Its odor strength is more than three times greater than beta ionone. While the odor of ionone remains less than 2 days on blotting paper, this product is of almost unchanged intensity, after 6 days. Because of its strength and stability, the substance is particularly valuable in soaps.

EXAMPLE 2

Preparation of 4-(2-butyl-3,6,6-trimethyl-cyclohexen-2-yl)-3-buten-2-one and 4-(2-ethyl-3-propyl-6,6-dimethyl-cyclohexen-2-yl)-3-buten-2-one (a) Preparation of 4,7-dimethyl-3-butyl-2,6-octadien-1-al and 7-methyl-3-ethyl 4-propyl-2,6-octadien-1-al.—The mixture of 4,7-dimethyl-3-butyl-1,6-octadien-3-ol and 7-methyl-3-ethyl-4-propyl-1,6-octadien-3-ol, prepared from a mixture of 6,9-dimethyl-8-decen-5-one and 4-propyl-7-methyl-6-octen-3-one as described in copending application Ser. No. 300,907, 210 g., is oxidized as described in Example 1(a) above. The crude product, 180 g. is 85.7% pure. The odor is earthy and very lasting.

(b) Preparation of 7,10-dimethyl-6-butyl-3,5,9-undecatrien-2-one and 6-ethyl-7-propyl-10-methyl-3,5,9-undecatrien-2-one.—The mixture of the two pseudoionones is obtained as described above in Example 1(b). Purity: 97–98%; B.P. 120°–123°/0.25 mm. $N_D^{20}=1.5193-1.5198$.

(c) Preparation of 4-(2-butyl-3,6,6-trimethyl-cyclohexen-2-yl)-3-buten-2-one and 4-(2-ethyl-3-propyl-6,6-dimethyl-cyclohexen-2-yl)-3-buten-2-one.—The mixture of pseudoionones, 50 grams, on cyclization with phosphoric acid, as described in Example 1(c), gives the mixture of ionones. Yield: 26 grams; B.P. 115°–120° C./0.3 mm.; $N_D^{20}=1.4970-1.4980$. Purity 97%. Ultraviolet analysis indicates the absence of carbon to carbon conjugated double bond, thus excluding the beta ionone configuration. The alpha ionone configuration with small amount of the gamma configuration, is established by nuclear magnetic resonance. The odor is of a wood base character which has extraordinary lasting power and is useful as a fixative for perfume components.

EXAMPLE 3

Preparation of 4-(2,6,6-trimethyl-3-isopropyl-cyclohexen-2-yl)-3-buten-2-one and 4-(2-isobutyl-6,6-dimethyl-cyclohexen-2-yl)-3-buten-2-one (a) Preparation of 3,7-dimethyl-4-isopropyl-2,6-octadien-1-al and 3-isobutyl-7-methyl-2,6-octadien-1-al.—The mixture of the two aldehydes is prepared from the mixture of 3,7-dimethyl-4-isopropyl-1,6-octadien-3-ol and 3-isobutyl-7-methyl-1,6-octadien-3-ol, which are prepared as described in our copending application Ser. No. 300,907.

Sixty-nine grams of the mixture of 3,7-dimethyl-4-isopropyl-1,6-octadien-3-ol and 3-isobutyl-7-methyl-1,6-octadien-3-ol, 70 g. of benzene, 43 g. of glacial acetic acid, 175 g. water and 57.5 g. $Na_2Cr_2O_7 \cdot 2H_2O$ are stirred together, while a 25% aqueous solution of sulfuric acid, containing 0.7 mole of the acid, are added at 27°–30° C. over a period of two hours. The reaction mixture is stirred for two additional hours, then let settle and the aqueous solution extracted with benzene. The combined oil and extract is washed with water, and then with aqueous KOH pH 8. After evaporation of the solvent, 62 g. crude material is obtained; purity, by oximation, 82.5%. On fractionation there is obtained a mixture of 3,7-dimethyl-4-isopropyl-2,6-octadien-1-al with 3-isobutyl-7-methyl-2,6-octadien-1-al. B.P. 87–91° C./0.22 mm.

$$N_D^{20}=1.4797-1.4817$$

(90% pure). The odor is of a waxy character, useful in rose compounds.

(b) Preparation of 6,10-dimethyl 7-isopropyl-3,5-9-undecatrien-2-one and 10-methyl-6-isobutyl-3,5,9-undecatriene-2-one.—The crude aldehyde mixture obtained in (a), 52 grams, is stirred for 20 hours at room temperature with 210 grams of acetone, and with a solution of 7.5 grams of NaOH in 140 grams of water. After neutralization with acetic acid and removal of acetone, the organic layer is separated and the aqueous layer extracted with benzene. There is obtained 56 grams of crude material, which, on distillation, gives 6,10-dimethyl-7-isopropyl-3,5,9-undecatrien-2-one and 10-methyl-6-isobutyl-3,5,9-undecatrien-2-one. B.P. 101–105° C./1.5 mm.; $N_D^{20}=1.5190-1.5200$; purity 96%.

(c) Preparation of 4-(2,6,6-trimethyl-3-isopropyl-cyclohexen-2-yl)-3-buten-2-one and 4-(2-isobutyl-6,6-dimethyl-cyclohexen-2-yl) 3-buten-2-one.—The same procedure described above with phosphoric acid is followed. The yield of the mixture 4-(2,6,6-trimethyl-3-isopropyl-cyclohexen-2-yl)-3-buten-2-one and 4-(2-isobutyl-6,6-dimethyl-cyclohexen-2yl)-3-buten-2-one is 21.5 grams from 35 grams of starting material; B.P. 90–93° C./0.15 mm.; $n_D^{20}=1.4945-1.4954$; purity 91%.

Ultraviolet analysis indicates the absence of a carbon to carbon conjugated double bond, thus excluding the beta ionone configuration. Nuclear magnetic resonance spectrum indicates the alpha ionone with a small amount of the gamma ionone configuration. The odor is of a fine dry violet type with very lasting power.

EXAMPLE 4

Preparation of 4-(2,3,3,6,6-pentamethyl-cyclohexen-1-yl)-3-buten-2-one and 4-(2-isopropyl-6,6-dimethyl-cyclohexen-1-yl) 3-butene-2-one (a) Preparation of 3,4,4,7-tetramethyl-2,6-octadien-1-al, and 7-methyl-3-isopropyl 2,6-octadien-1-al.—158 grams of crude aldehyde mixture is obtained by reaction of 182 grams of the mixture of tertiary carbinols, 3,4,4,7-tetramethyl-1,6-octadien-3-ol and 7-methyl-3-isopropyl-1,6-octadien-3-ol in 250 grams of acetone, with $Na_2Cr_2O_7 \cdot 2H_2O$ in 25% sulfuric acid as described above.

On fractionation, the aldehyde mixture is obtained, B.P. 69–72°/0.2 mm.; $n_D^{20}=1.4921$. The product has a modified citrus odor in the direction of melon and imparts a very fresh note to perfume compounds.

(b) Preparation of 6,7,7,10-tetramethyl-3,5,9 - undecatrien-2-one and 10-methyl-6-isopropyl 3,5,9-undecatrien-2-one.—The mixture of the carbinols, 182 grams, in 250 ml. of acetone is treated with $Na_2Cr_2O_7.2H_2O$ in 25% sulfuric acid, as described in Examples 1(b) and 2(b). The organic layer, after addition of acetone and aqueous NaOH, is let stand at room temperature, and the product, 218 grams, on distillation gives a mixture of the pseudoionones, B.P. 126°–132° C./0.7 mm.; $n_D^{20}=1.5285$–1.5300.

(c) Preparation of 4 - (2,3,3,6,6 - pentamethyl - cyclohexen-1-yl)-3-buten-2-one and 4-(2-isopropyl - 6,6 - dimethyl-cyclohexen-1-yl 3-buten-2-one.—The general procedure for cyclization with sulfuric acid consists of adding a mixture of one part of the pseudoionone homolog and one part of petroleum ether to a mixture of 1.5 parts of acetic acid and 3.5 parts of 85% sulfuric acid, at −20° C. to −10° C. The addition requires 1 to 3 hours. The mixture is then allowed to warm up to 0° C. After about 2 hours, the mixture is poured into ice, the product extracted with petroleum ether, the extract washed and dried. Application of this procedure gives 36 grams of the ionones from 45 grams of the mixture of pseudoionones from Experiment 4(b) above. B.P. 75–80° C./0.9 mm.; $n_D^{20}=1.5070$–1.5080. Purity: 99% by oximation.

*Analysis.*—Calcd for $C_{15}H_{24}O$: C, 81.76%; H, 10.97%. Found: C, 81.27%; H, 10.81%.

Ultraviolet analysis indicates the presence of a carbon to carbon conjugated double bond, indicative of the beta ionone configuration.

Cyclization of 46 g. of the pseudoionones obtained in (b) above, with phosphoric acid, according to the procedure described in Example 1(c), gives 25 g. of the same product. B.P. 77°–84° C./0.12 mm.; $n_D^{20}=1.4999$–1.5020. Purity: 96–98%, by oximation Ultraviolet analysis and nuclear magnetic resonance spectrum show the beta ionone structure, with substantial amount of the gamma isomer present.

The odor of the mixture of ionones is an especially soft, smooth, powerful and tenacious violet type. In addition it possesses, to a remarkable degree, the sweet, heavy notes of sandalwood oil, and a powerful ambrette character. This odor is also very valuable for incorporation into soaps, due to extreme strength and stability.

The following examples illustrate the application of the novel ionones of the invention to perfumery compositions.

EXAMPLE 5

The odor character and effectiveness as a fixative of the substance from Example 1(c), 4[(9-10)-dehydro-2,2-decahydronaphthyl-1] 3-buten-2-one may be evaluated as follows. A formulation designated herein as "Ambergris Synthetic 'D'," is prepared from 60 parts of the substance from Example 1(c), 35 parts of cedrenol, 3 parts of labdanum absolute, and 2 parts of oil calamus, the latter as a 10% solution in diethyl phthalate. The fixative and odor value of this formulation which depends on the product D are compared with natural ambergris, 1/10, that is an infusion from four ounces natural ambergris in one gallon of 95% ethanol, and evaporation to one-tenth of its original volume.

A perfume formulation was prepared from:

| | Parts |
|---|---|
| Concentrated infusion natural musk 1/10 | .5 |
| Diphenyl-methane | .5 |
| Vetivert bourbon | .5 |
| Clary sage | .5 |
| Jasmin absolute | 1.0 |
| Methyl ionone gamma | 2.5 |
| Sandalwood | 2.5 |
| Coumarin | 2.5 |
| Benzyl benzoate | 4.0 |
| Musk ketone | 5.0 |
| Heliotropine | 5.0 |
| Hydroxycitronellal | 5.0 |
| Iso-butyl phenyl acetate | 5.0 |
| Rose kazanlik synthetic | 5.0 |
| Labdanum absolute | 5.0 |
| Benzoin absolute | 5.0 |

To the above formulation is added 0.5 part of ether the concentrated infusion of natural ambergris 1/10 or "Ambergris Synthetic 'D' ". The comparison between the two formulations is made by impregnating strips of blotting paper, ¼ inch wide and submitting them for evaluation to a panel of five individuals. No difference in the above-mentioned beneficial effects is detected and both strips show the same odor and intensity after 1 day and after 6 days. The odor, after 6 days, is weaker, in both instances, but of identical strength. This test shows that "Ambergris Synthetic 'D' " is equivalent to the natural ambergris in odor character as well as fixative power.

Infusion of ambergris is used in perfumery not only for its fixative value but for its pronounced effect in smoothing, enhancing, and diffusing alcoholic perfumes and for its own warm, rich, characteristic odor. In view of the fact that natural ambergris infusion is a very high cost natural fixative and that its preparation involves aging the natural product in alcohol for a period of one year, the ionone of this invention, that is, 4[(9-10) dehydro-2,2-decahydronaphthyl-1] 3-buten-2 - one, manifestly constitutes a very valuable and economical synthetic perfume fixative.

EXAMPLE 6

The ambrette-sandalwood odor of the mixture from Example 4(c), consisting of 4-(2,3,3,6,6-pentamethyl-cyclohexen - 1-yl)-3-buten-2-one and 4-(2-isopropyl-6,6-dimethyl-cyclohexen-1-yl) 3-buten-2-one is evaluated as follows. A formulation is prepared from 50 parts of the mixture from Example 4(c), 40 parts of p-isobutyl alpha-methyl hydrocinnamaldehyde, 4 parts of 1-actanol, 3 parts of methyl nonyl acetaldehyde in 10% diethyl phathalate solution, and 3 parts of oil wine lees white. This formulation, which is called herein "Ambrette Synthetic H," is compared with natural ambrette seed oil by adding both to a floral perfume formulation. For the purpose of comparison, a perfume formulation is prepared as follows:

| | Parts |
|---|---|
| Sage clary | .5 |
| Rosemary | 2.5 |
| Ylang ylang extra | 2.5 |
| Jasmin absolute from chassis | 5.0 |
| Benzyl benzoate | 8.0 |
| Geraniol extra | 10.0 |
| Bergamot | 10.0 |
| Benzoin absolute | 20.0 |
| Lavender extra 40/42% | 40.0 |

The test is conducted by adding to the above formulation either 1.5 parts of ambrette synthetic H or 1.5 parts of natural ambrette seed oil as a 33.33% solution and evaluating the perfume in a comparative manner. The synthetic substitute for the natural ambrette seed oil is just as effective, because when the two formulations are evaluated by a panel of five individuals, no difference in the enhancement of the perfume formulation, is detected.

Ambrette seed oil is a natural perfume material derived from the seed of the plant *Abelmoschus moschatus* Moench, Syn. *Hibiscus abelmoschus* L. (fam. Malvaceae). This oil is a valuable adjunct in high grade perfume compositions to which it imparts alluring tonalities and strong and characteristic musk-like notes. In view of the high cost of natural ambrette seed oil, the ionone mixture obtained according to the present invention is a valuable and economical replacement for the natural material.

What is claimed is:
1. 4 - [(9 - 10) - dehydro-2,2-decahydronapthyl-1]3-butene-2-one.

References Cited

UNITED STATES PATENTS 3,057,913  10/1962  Guex _____ 260—586

FOREIGN PATENTS 797,980  7/1958  Great Britain.

BERNARD HELFIN, Primary Examiner
M. J. JACOB, Assistant Examiner

U.S. Cl. X.R.

252—522; 260—586, 593, 598, 601, 603

UNITED STATES PATENT OFFICE
CERTIFICATE OF CORRECTION

Patent No. 3,480,677        Dated November 25, 1969

Inventor(s) Walter C. Meuly and Peter S. Gradeff

It is certified that error appears in the above-identified patent and that said Letters Patent are hereby corrected as shown below:

<u>Col. 2, line 67,</u> "Then" should read -- The --;

<u>Col. 7, line 39,</u> There should be a period (.) following "oximation";

SIGNED AND
SEALED
JUN 16 1970

(SEAL)
Attest:

Edward M. Fletcher, Jr.
Attesting Officer

WILLIAM E. SCHUYLER, JR.
Commissioner of Patents